United States Patent [19]

LeCorney

[11] Patent Number: 5,377,195
[45] Date of Patent: Dec. 27, 1994

[54] LEAKY BUCKET FOR SUPERVISION IN INDUSTRIAL PROCESSES

[75] Inventor: David C. LeCorney, Hägersten, Sweden

[73] Assignee: Telefonaktiebolaget L M Ericsson, Stockholm, Sweden

[21] Appl. No.: 862,203

[22] Filed: Apr. 2, 1992

[51] Int. Cl.⁵ ............................................. G06F 11/00
[52] U.S. Cl. ..................................... 371/5.1; 371/11.2
[58] Field of Search ......................... 371/5.1, 5.2, 11.2, 371/16.1, 20.1, 32, 29.1, 31, 57.1, 11.1, 9.1, 15.1; 364/134, 187, 186, 131, 132, 133

[56] References Cited

U.S. PATENT DOCUMENTS

| | | | |
|---|---|---|---|
| 4,034,340 | 7/1977 | Sant'Agostino | 340/146.1 R |
| 4,059,731 | 11/1977 | Green et al. | 340/146.1 R |
| 4,200,838 | 4/1980 | Poitevin | 371/22.1 |
| 4,377,000 | 3/1983 | Staab | 371/11.2 |
| 4,551,842 | 11/1985 | Segaria | 371/69.1 |
| 4,710,926 | 12/1987 | Brown et al. | 371/9.1 |
| 4,730,313 | 3/1988 | Stephenson et al. | 371/5.1 |
| 4,744,028 | 5/1988 | Karmarkar | |
| 4,789,948 | 12/1988 | Von der Embse | 371/82.1 |
| 5,138,616 | 8/1992 | Wagner, Jr. et al. | 371/5.1 |
| 5,228,028 | 7/1993 | Cucchi et al. | 371/31 |

FOREIGN PATENT DOCUMENTS

2714238C2   2/1986   Germany .
WO-A1-
7900585   8/1979   WIPO .

*Primary Examiner*—Robert W. Beausoliel, Jr.
*Assistant Examiner*—Dieu-Minh Le
*Attorney, Agent, or Firm*—Johnson & Wortley

[57] ABSTRACT

A method for reacting to disturbances that occur in industrial processes includes the steps of extracting information regarding occurrence of disturbances from an industrial process, transmitting the extracted information to a disturbance filter which includes a leaky bucket having a defined disturbance step and floor and ceiling height for the disturbances, and triggering an alarm when occurrence of disturbances in the industrial process falls without the defined disturbance step and floor and ceiling height. The present invention also provides a rigorous method of setting parameters within a leaky bucket algorithm.

7 Claims, 2 Drawing Sheets

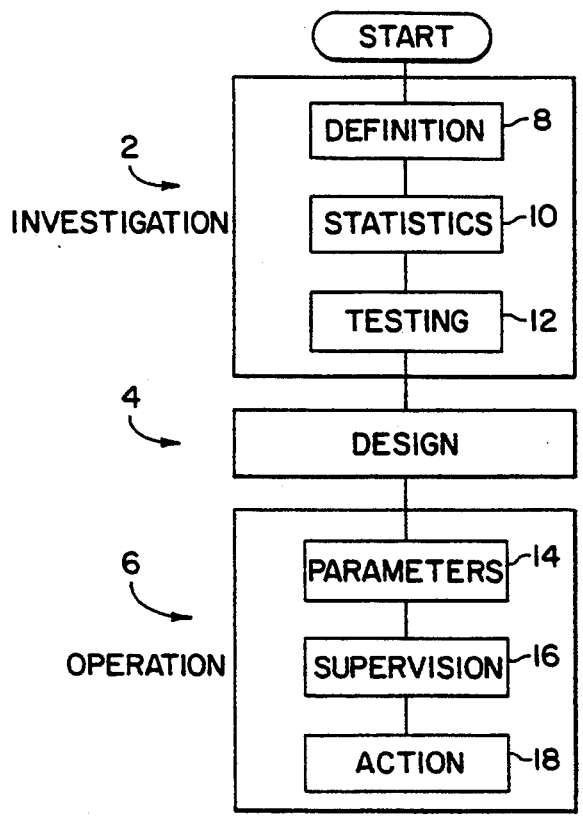
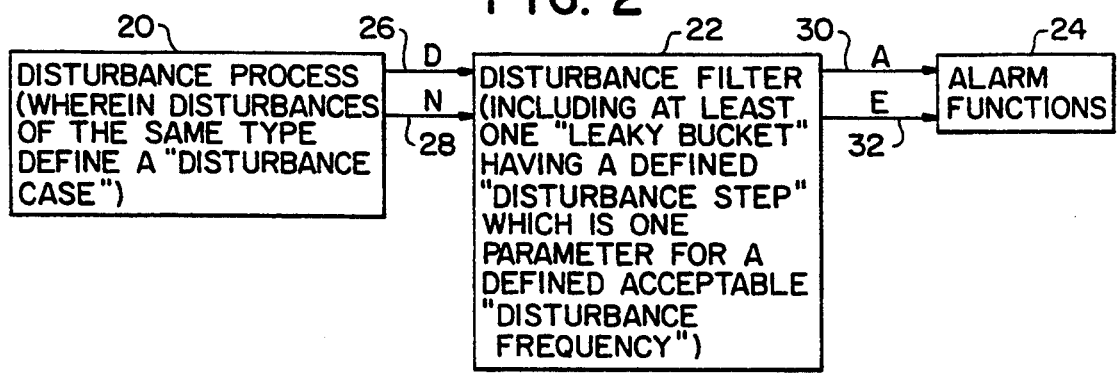
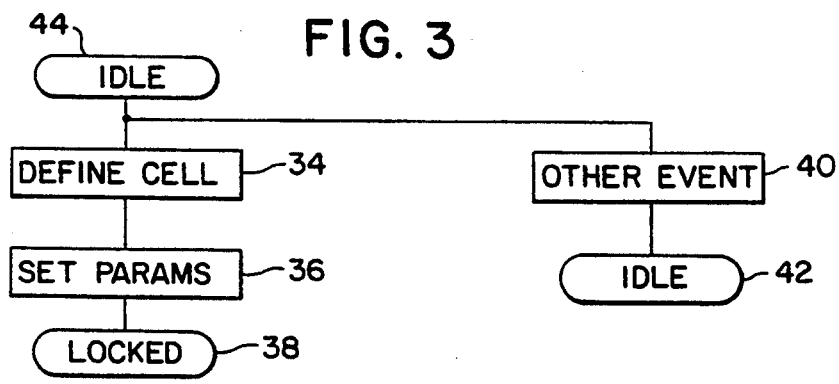

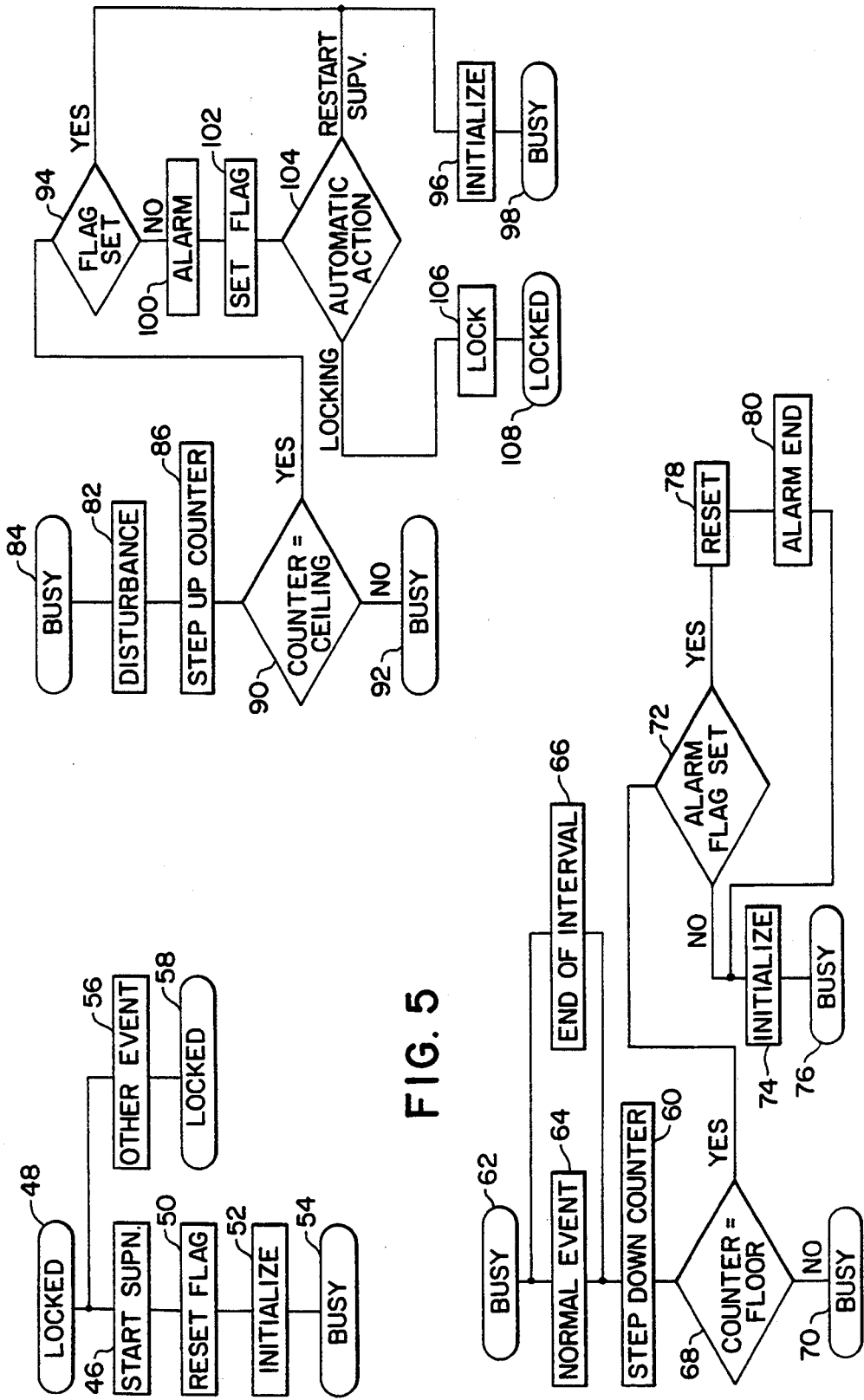

LEAKY BUCKET FOR SUPERVISION IN INDUSTRIAL PROCESSES

BACKGROUND OF THE INVENTION

1. Field of the Invention

The invention relates to the supervision of errors (or "disturbances") in industrial processes and, more particularly, to disturbance supervision algorithms used in the operation of telecommunications exchanges.

2. History of the Prior Art

Errors periodically occur in virtually every industrial process known to man. Thus, most mechanized processes include some way to detect the occurrence of errors in order to call them to the attention of an operator when required. The significance of an error within a process is determined by the nature of the error as well as the frequency with which such errors occur. Moreover, in complex industrial complexes such as those performed by telecommunications switching exchanges and digital computers, such occurrences are generally referred to as a disturbance, simply indicating the occurrence of an anomalous event within the process. For example, a disturbance can be a parity error during the exchange of data, or a sporadic hardware fault within the system. Other examples of abnormal events within such systems referred to as disturbances include:

a. A cyclic redundancy check (CRC) error;
b. Congestion within the system;
c. The occurrence of a greater number of bit errors in a particular time frame than the bit correction algorithm can cope with;
d. Software exceptions within the system; and
e. Data inconsistencies detected during runtime.

Single disturbances within such systems produce any need for the raising of an alarm; but when disturbances become too frequent within a system, a technician should generally be notified so as to be able to take remedial action to prevent system failure. Moreover, it is generally the number of disturbances as a proportion of the number of events during which a disturbance could possibly occur which is of most interest to an operator of a process, e.g., five disturbances within the sequence of one hundred events is of much greater interest than ten disturbances during the occurrence of a million such events. The monitoring and measurement of the number of disturbances which occur during a sequence of events and the production of an alarm when the number of disturbances become too great is known as disturbance supervision.

The concepts of disturbance and disturbance supervision are applicable to virtually all fields of industrial processing. In principle, any event, the occurrence of which is undesirable but not in itself sufficient reason to raise an alarm, can be classified as a disturbance. Only when the frequency of these undesirable events becomes "too high" in some sense or another is it desired to raise an alarm. Other examples of disturbances within industrial processors could include:

a. Paper getting stuck in a copying machine;
b. The misfiring of cylinders in an engine; and
c. The occurrence of a false result in a blood test.

In general, however, the analysis of disturbance alarm supervision in accordance with the principle of the present invention relates principally to disturbance frequencies which are no greater than about one percent of the frequency of normal events. This restriction is for basically two reasons:

a. The mathematics for analyzing disturbances have a number of special characteristics at low disturbance frequencies; and
b. The mathematics break down for high disturbance frequencies.

THE RANDOM WALK

Typically, disturbances in industrial processes occur as some type of stochastic processes and, in particular, the process known as a "random walk." To fully appreciate this concept, random variables, stochastic processes, and the random walk process must be understood. A random variable X is a process of assigning a number X(A) to every outcome A of an experiment or the like. The resulting function must satisfy two conditions but is otherwise arbitrary. The two conditions that must be satisfied are (1) the set $\{X \leq x\}$ is an event for every x, and (2) the probabilities of the events $\{X=\text{infinity}\}$ and $\{X=\text{negative infinity}\}$ both equal zero. Stated even more simply, a random variable X is a rule for assigning to every outcome A of an experiment L a number X (A). Expressed in a similar way, a stochastic process X (t) is a rule for assigning to every outcome A a function X(t,A). Thus, a stochastic process is a family of time-functions depending on the parameter A or, equivalently, a function of t and A. The domain of A is the set of all experimental outcomes and the domain of t is a set T of real numbers.

A random walk process is simply one of a number of stochastic processes. A random walk process is most easily comprehended by imagining an experiment consisting of the tossing of a coin a large number of times. In such an experiment the tossings occur every T seconds and after each tossing a step of length S is instantly taken upwards if heads shows and downwards if tails shows. The process starts at t=0 and the location at time t is a step function with discontinuities at the points t=n. Very simply then, a random walk process is a discrete-state stochastic process whose samples depend on a particular sequence of events.

Within the framework of the present invention, yet another vision of a "random walk" process is useful. It may be imagined that there are two thresholds, one designated a ceiling and the other designated a floor. Counting may then begin with a marker midway between the ceiling and the floor. Each time there is a disturbance the marker may be moved up toward the ceiling and each time there is a normal event the marker may be moved down toward the floor. It is not necessary that the amount of movement upward be exactly equal to the amount of movement downward. In particular, since disturbances are relatively rare, it is most feasible to move the marker upward a relatively large amount (e.g., 100 increments) and downward in relatively small amounts (e.g., one increment). In this process hitting the ceiling can be defined as an unacceptable disturbance frequency, and hitting the floor can be defined to signify an acceptable disturbance frequency. Once the marker hits either the ceiling or the floor, it can be reset in between the ceiling and floor and counting can continue.

Although it is known that disturbances in some industrial processes occur in a random walk form, it is also known that in other industrial processes disturbances can occur in "bursts" or "showers", in which analyses based upon conventional random walk related theories break down. Hereinafter, the term "lumpy" will be used for disturbances which occur in bursts and the word "smooth" will be used for disturbances which are non-bursts, i.e., in accordance with the random walk.

THE LEAKY BUCKET

In the supervision of disturbances, there are a number of different algorithms which have been used to process the occurrences of disturbances and evaluate those occurrences in terms of the total number of events within which the disturbances are occurring. On common method is referred to as the "leaky bucket" technique. This technique derives its name from the metaphorical concept of a bucket which is being filled by disturbances which, over a period of time, are leaking out a hole in the bottom of the bucket. If the disturbances are occurring at a rate and over a period of time which is sufficient to fill and overflow the bucket faster than they leak from the hole in the bottom, a supervision alarm is produced. This concept introduces the parameter pf passage of time and the number of events during which the disturbances occur. In particular, the leaky bucket algorithm includes a number of parameters which must be chosen in order for the algorithm to be used and which include:

a. The size of the bucket;
b. The size of the hole in the bottom (which is generally normalized to one); and
c. The size of the cup used in filling the bucket. The size of the bucket is the difference in height between the ceiling and the floor. The size of the step is called the disturbance step.

PRIOR ART USE OF THE LEAKY BUCKET

In prior art systems that use the leaky bucket algorithm to provide disturbance supervision within processes such as telecommunication exchanges, the supervision parameters for the bucket are selected in a relatively arbitrary fashion. As a result, the alarms which are produced by the leaky bucket algorithm are just as arbitrary and full of false indications of alarm conditions. Similarly, such algorithms may also produce false negatives and fail to produce an alarm despite the fact there is a high level of disturbances going on within the process. The inaccuracies produced by poorly chosen supervision parameters become even more acute when faced with lumpy or bursty disturbance conditions within the process. Frequently, inaccurate supervision algorithms within telecommunications exchanges produce so many alarms that the monitoring technician becomes psychologically numb to the alarms and simply ignores them or, worse yet, disables the alarm supervision system due to the annoying frequency of disturbance alarms.

Thus, a rigorous method of setting the supervision parameters within the supervision algorithms so as to produce accurate results is highly desirable. The system of the present invention provides such a technique.

SUMMARY OF THE INVENTION

The present invention provides a method for reacting to disturbances that occur in an industrial process. The method of the present invention comprises three steps. The first step involves extracting information from the industrial process as to occurrence of normal events and occurrence of disturbances. The second step entails transmitting the extracted information to a disturbance filter which includes a leaky bucket having a defined disturbance step and floor and ceiling height for the disturbances. The third step of the method of the present invention involves triggering an alarm when occurrence of disturbances in the industrial process falls without the defined disturbance step and floor and ceiling height. As mentioned above, the present invention also provides a rigorous method of setting parameters for the leaky bucket algorithm.

BRIEF DESCRIPTION OF THE DRAWINGS

For an understanding of the present invention, and for further objects and advantages thereof, reference may now be had to the following description, taken in conjunction with the accompanying drawings, in which:

FIG. 1 is a block diagram flow chart summarizing a method according to the teachings of the present invention;

FIG. 2 is a block diagram depicting leaky bucket supervision as a "disturbance filter";

FIG. 3 is a flow chart showing the state-transition stages of a bucket or cell when an idle cell is seized;

FIG. 4 is a flow chart showing the state-transition stages of a bucket or cell when supervision starts;

FIG. 5 is a flow chart showing the state-transition stages of a bucket or cell when a counter is stepped down; and FIG. 6 is a flow chart showing the state-transition stages of a bucket or cell in the presence of a disturbance.

DETAILED DESCRIPTION

Referring now to the drawings and, more particularly, to FIG. 1, there is set forth a block diagram flow chart in which the method of the present invention is summarily shown. In FIG. 1 the method or process of the present invention is shown to comprise three main tasks, which are investigating 2, designing 4, and operating 6. The investigating task 2 is shown to comprise three sub-tasks, those being defining 8, collecting statistics 10, and hypothesis testing 12. The design task 4 is not shown to comprise any major sub-tasks. The third task, operating 6, like the investigating task 2, is also shown to comprise three sub-tasks. The three operating sub-tasks are choosing parameters 14, supervising 16, and acting 18. Each of these tasks and sub-tasks are discussed in detail hereinbelow.

DEFINITION OF DISTURBANCE PROCESS AND DISTURBANCE

One of the first procedures in the selection of disturbance parameters for a supervision algorithm is an analysis of the disturbance process within the industrial process under consideration. Such an investigation includes determining:

a. What the disturbance process is;
b. How the process behaves in normal circumstances;
c. How the process behaves when it is malfunctioning; and
d. Why the process malfunctions.

As mentioned above, the task of investigating a disturbance process can be further broken down into three tasks or stages. The three stages are defining the disturbance process, designing a supervisory algorithm, and operating a system using the supervisory algorithm. Each of these three tasks is discussed in detail below.

REGULAR AND IRREGULAR DISTURBANCE PROCESSES

Defining the disturbance process (designated by reference numeral 8 in FIG. 1) involves determining what constitutes a disturbance. Further, a decision must be made whether the process is regular or irregular. In a regular disturbance process events occur at regular intervals. In an irregular disturbance process, on the other hand, events occur at irregular intervals. In a regular disturbance process a normal event is simply a time interval without a disturbance. Often this interval is very short, and is called the micro-time interval. It may well be that micro-time is a time frame, for example, 125 micro-seconds. In such a case, a normal event can be defined to be a frame which includes no disturbances. On the other hand, there may not be any natural choice for the micro-time interval. In such a case, an arbitrary choice must be made. Once again, a normal event is simply an interval that does not include a disturbance. Once a micro-time interval is chosen, a macro-time interval must also be chosen. A macro-time interval is simply a concatenation of micro-time units. Macro-time is used to run supervision processes when, e.g., it is impractical to supervise very quickly, i.e., in micro-time. Again, there may be a natural, obvious choice. Otherwise, an arbitrary choice must be made.

In the case of an irregular disturbance process, the defining step simply requires defining what a disturbance is. For example, a disturbance may be defined in a telecommunication system to be a telephone call that is unsuccessful for some reason. In such a case, a normal event would be a successful call.

STATISTICS

Referring now to the block designated by reference numeral 10 in FIG. 1, the investigating stage also involves gathering statistics about the disturbance process. In gathering these statistics, it is convenient to adopt a convention that zero (0) equals a normal event and that one (1) equals a disturbance. In practice, some apparatus for collecting bit sequences from different instances in the same disturbance process may need to be devised. For example, in practice of the method of the present invention in a telecommunications system, it may be necessary to collect statistics from different trunks in the same circuit group, as well as from trunks in different circuit groups. Of course, bit sequences of a sufficient number of bits must be collected in order to obtain significant, meaningful results. Via this gathering statistics step, it may be determined what is typical behavior for a disturbance process and how much it varies within, and between, for example, circuit groups. Also, in this step the feasibility and value of gathering statistics about disturbance processes that are malfunctioning, that is, producing too many disturbances, should not be overlooked.

TESTING

A third step in the investigating stage 2 is testing 12, which involves determining whether the disturbance is smooth or lumpy. To fully understand the reason for this determination, a discussion of random walk and semi-random walk processes is appropriate. Adding to what has been said in the statement of related art section above, in a random walk process it may be assumed that the probability of an event $n+1$ resulting in a disturbance is independent of what happened at event n. It can be said that the following transition matrix applies:

$$X(n) \quad \begin{matrix} 0 \\ 1 \end{matrix} \begin{bmatrix} pq \\ pq \end{bmatrix} \quad \text{matrix 1}$$

$$\begin{matrix} & (n+1) = & 0\ 1 \end{matrix}$$

where $X(n)=0$ means "normal event at time n" and $X(n+1)=1$ means "disturbance at time $n+1$", and so on.

In practice, p (the probability of a normal event) tends to be large, generally about 0.99, and q (the probability of a disturbance) is relatively small, generally about 0.01.

The practical consequence of applying a stochastic matrix such as matrix 1 is that disturbances will be short and isolated. The disturbance periods will seldom be longer than a single disturbance. The process cannot "remember" whether or not it just had a disturbance.

A semi-random walk, on the other hand, involves some memory built into the process. That is, there is an underlying fact that once a disturbance has occurred, then it is more likely to be followed by another disturbance than if a disturbance has not just occurred. In such a case, the following stochastic matrix applies:

$$X(n+1) = \quad 0\ 1$$

$$X(n) \quad \begin{matrix} 0 \\ 1 \end{matrix} \begin{bmatrix} pq \\ QP \end{bmatrix} \quad \text{matrix 2}$$

where p and q are typically 0.999 and 0.001, respectively, but where P is about 0.9 and Q is about 0.1.

In processes governed by matrix 2, when there is no disturbance, there tends to be no disturbance for a long time. On the other hand, when there is a disturbance, disturbances tend to continue for quite a period or time. Still further, state changes do not occur frequently. Of course, the meaning of the expressions relating to length of time are defined by the parameters p, q, P and Q. Henceforth in this document this latter type of process with a short memory is called a "semi-random walk".

An important question is whether a given disturbance process has no memory and matrix 1 applies, that is, is a genuine random walk; or whether it has a memory and matrix 2 applies, that is, it is a semi-random walk. Henceforth in this document processes that obey in matrix 2 will be called "lumpy" and processes that obey matrix 1 will be referred to as "smooth".

One method of answering the question raised in the immediately preceding paragraph, which method uses estimated values of parameters, proceeds as follows. By way of example only, suppose that there is a sequence of events as follows: 0011100001100111010 . . . , where 0 means normal event and 1 means disturbance. In such a case, the disturbance frequency can be defined as the proportion of 1's to the total number of events in the whole sample. A null hypothesis, H0, can be made that the process is smooth, and an alternative hypothesis, H1, can be made that the process is lumpy. From the above sequence of events, or bit sequence, one can easily count the values $n_{00}$ to $n_{11}$ in the following matrix:

$$\begin{bmatrix} n_{00} n_{01} \\ n_{10} n_{11} \end{bmatrix}$$

where $n_{01}$ is the number of transitions 0→1, and so on.

Now, within plus or minus 1, the number of transitions from 0 to 1 must be the same as the number of transitions from 1 to 0. Also, if one is to obtain any meaningful analysis of the matrix set forth above, one must have "large" numbers to start with. Therefore, one can safely assume that $n_{01} = n_{10}$.

Therefore, under H0, p in matrix (1) is estimated by $$(n_{00}+n_{10})/(n_{00}+n_{01}+n_{10}+n_{11})$$

and q by $$(n_{01}+n_{11})/(n_{00}+n_{01}+n_{10}+n_{11}).$$

In these equations, q is the disturbance frequency. Now, $n_{11}$ is a binomial random variable whose "n" parameter is $n_{10}+n_{11}$. The "p" parameter of nil is estimated by "q" above. With these values, the expected value of $n_{11}$ may be estimated by nq and the variance of $n_{11}$ may be estimated as nqp. If the actual value of ndiffers significantly from its expected value, one can reject H0.

By way of example, one may assume a bit sequence of 1001 bits. Such a bit sequence has 1000 transitions, as follows:

$$\begin{bmatrix} 750 & 100 \\ 100 & 50 \end{bmatrix}$$

$n_{11} = 50$
$n = 150$
estimate of $q = 0.15$
estimate of $p = 0.85$
$En_{11} = nq = 22.5$
Variance, $Vn_{11} = nqp = 19.1$
Standard Deviation of $n_{11} = 4.4$ In this example, the actual value of $n_{11}$ exceeds its expected value by more than 5 standard deviations. Therefore, one may properly conclude that the bit sesquence was generated by a lumpy disturbance process.

With respect to estimating lumpy parameters, if one rejects H0 and accepts Hi, one may estimate the parameters p, q, P, and Q in matrix 2. These values may be calculated as follows:

$$p = n_{00}/(n_{00}+n_{01}) = 750/850 = 0.88$$

in the example above, $$q = n_{01}/(n_{00}+n_{01}) = 100/850 = 0.12,$$

$$Q = n_{10}/(n_{10}+n_{11}) = 100/150 = 0.67,$$

$$P = n_{11}/(n_{10}+n_{11}) = 50/150 = 0.33.$$

Two other values, r and $m^2$, may also be defined. The value r is the determinant of matrix 2, and is the correlation coefficient between X(i) and X(i+1). Thus, r is a measure of the lumpiness of the disturbance process. Here, $r = pP - qQ = 0.29 - 0.08 = 0.21$. The value $m^2$ is the variance magnification factor of the summation of X(i) due to the fact that the X(i)'s are correlated. Here, $m^2 = (1+r)/(1-r) = 1.21/0.79 = 1.53$; and $m = 1.23$.

Based on the foregoing, in the example above one can term the disturbance process "slightly lumpy."

Those skilled in the art should appreciate that the above calculations and examples are hampered somewhat by the use of estimates. It is appropriate, if not necessary, to analyze bit sequences of many (e.g., at least one million) bits in order to obtain reliable estimates of parameters.

As a final comment, it may observed that in all realistic cases p is very close to 1, and q is very small. Therefore, the determinant r of matrix 2 will be totally dominated by the value of the parameter P. Thus, we can say that $r = P$ and $m^2 = (1+P)/(1-P) = (1+P)/Q$.

Referring back to FIG. 1, and specifically to blocks 12 and 2, it may be noted that completion of testing effects completion of the investigation portion of the process of the present invention. The next step in the exercise of the process of the present invention is designing (which is designated by reference numeral 4 in FIG. 1).

DESIGN

An implementation of the leaky bucket may include the following features:

Regular and irregular disturbance processes;
Macro-time for regular processes;
One counter for each supervision;
Starting and stopping supervision;
Alarm mechanism;
Choice of automatic actions on alarms (locking of the device or restart of supervision);
Adjustable supervision parameters; and
Restarting the supervision when the counter hits the floor.

At a high level, a leaky bucket supervision effectively works as a "disturbance filter". The interrelationship between a disturbance process 20, a disturbance filter 22, and alarm functions 24 is shown in block diagram form in FIG. 2.

For each disturbance, the disturbance process informs the disturbance filter by signal D 26. For each normal event in the disturbance process, the disturbance filter is informed by signal N 28.

When the disturbance filter determines that the disturbance frequency is "too high" in some sense, the alarm function is informed by signal A=alarm 30. If and when the disturbance frequency drops to an acceptable level, the alarm function is informed by signal E=alarm end 32.

Viewing the above described process on a lower level, and using a telecommunications system as an underlying example, the disturbance filter 22 consists of the following software units, which are interconnected:

A Set of Buckets

This is the heart of the mechanism. It consists of a large number (1000 or more) buckets. Each bucket has the following attributes:

state;
counter;
alarm flag;
row index;
column index; and
supervision parameters.

With respect to row and column index, the non-idle buckets form a two-dimensional jagged array, or matrix. Typically there may be 100 or so rows. Each row is specific for a "disturbance case". Typically, a disturbance case could be:
congestion supervision on circuit groups;
level 2 supervision of ISDN; or
synchronization error supervision on PCM links.
Each disturbance case or row has a number of columns or cells. The number of cells varies from row to row, and can be any number from one to 100 or more. Therefore, a set of buckets appears as a jagged matrix.

Each cell supervises a set of similar instances of an object, for example:
In disturbance case A, one cell supervises the trunks on a route from Stockholm to London, whilst another cell supervises the route from Stockholm to New York;
In disturbance case B, there is one cell for each optical link;
In disturbance case C, there is just a single cell.

With respect to bucket state, the bucket state can take the values IDLE, BUSY and LOCKED, in accordance with ISO standard, specifically, ISO/IEC DIS 10164-2 State Management Function.

The counter is normally an integer counter, which is stepped up by the disturbance step for every disturbance. It may be stepped down by one for each normal event in an irregular disturbance process, or at the end of each macro-time interval in a regular disturbance process.

By way of example only, the counter may be set to zero at the start of supervision. When it hits the floor F which is negative, the supervision may be restarted from zero. If it hits the ceiling C which is positive, some actions may be taken which are described below. In practice, the counter can be initialized to the absolute value of F. The new floor is zero, and the ceiling is abs (F)+C.

The alarm flag simply states whether the alarm has been raised for the suspension cell (column).

The supervision parameters consist of:
the disturbance step; and
the height of the floor and ceiling.
These can be set either per supervision cell or per disturbance case, and may vary from case to case. If they are set per disturbance case, the values stored in the cell are simply copies of the values stored for the whole case.

Disturbance Case (Row) Manager

This contains functions for:
creating and deleting supervision cases (rows);
setting its attributes (supervision parameters and actions on alarm) for the whole disturbance case;
reading its attributes; and
starting and stopping the supervision for the whole disturbance case.

Actions on alarm may be essentially a single bit which indicates whether the supervision is halted on alarm or whether it is restarted.

Supervision Cell (Column) Manager

This contains functions for:
defining and undefining supervision cells (columns);
setting attributes (supervision parameters) for the cell;
reading its attributes; and
starting and stopping the supervision, per cell.

Clock

For some disturbance cases that are regular there is no normal event. Instead, the clock generates a signal at the end of each macro-interval. The length of the macro-interval may also be a supervision parameter for that case.

Expert System (optional)

It could be useful, though not essential, to have an expert system which contains guidelines on the setting of supervision parameters.

Referring now to FIGS. 3, 4, 5 and 6, there is shown in flow chart form various operations that may be performed in embodiments of the present invention. More specifically, FIG. 3 depicts possible logic flow in seizing an idle cell, FIG. 4 depicts possible logic flow in starting supervision, FIG. 5 depicts possible logic flow in stepping down a counter, and FIG. 6 depicts possible logic flow relating to disturbances. In these various figures, it may be seen that the various cells can take one of three states, according to the ISO standard:
IDLE=the cell is not active;
BUSY=supervision is active; or
LOCKED=the cell is seized for supervision, but is not active.

In addition, it may be seen in the various figures that embodiments of the present invention may include an alarm flag which indicates whether alarm has been raised for the cell. Further details regarding the logic flow in FIGS. 3, 4, 5 and 6 are set forth immediately below.

Referring to FIG. 3 it may be seen that seizing an idle cell involves defining the cell (see block 34), setting parameters for the cell (see block 36), and locking the cell (see block 38). Any other event (see block 40), results in the cell remaining idle (a state designated by blocks 42 and 44 in FIG. 3).

Referring to FIG. 4 it may be seen that starting supervision (see block 46) of a locked cell 48 involves resetting the cell's flag (see block 50) and initializing the cell (see block 52) to put the cell into a busy state (designated by block 54 in FIG. 4). If any other event occurs (see block 56), the cell remains locked (see block 58).

Referring to FIG. 5 it may be seen that the occurrence of a normal event results in stepping down the counter, in the busy state. In a regular disturbance process with no normal event, the end of an interval has the same effect as a normal event. If the step down does not hit the counter floor (see block 68 ), the cell remains busy (designated by block 70 in FIG. 5). If the step down does hit the counter floor (see, again, block 68, the question arises whether the alarm flag is set (see block 72). If the alarm flag is not set, initialization is effected (see block 74) and the cell remains busy (see block 76). If, on the other hand, the alarm flag is set, it is reset (see block 78), the alarm is terminated (see block 80), and then initialization is effected (see, again, block 74) and the cell remains busy (see, again, block 76).

Referring to FIG. 6 it may be seen that disturbances (see block 82) affect a busy cell (designated by block 84) by stepping up the counter (see block 86). At that point, the question arises whether or not the ceiling has been hit (see block 90). If no, the cell remains busy (see block 92). If yes, the questions arises whether or not the cell's flag is set (see block 94). If the answer to that question is yes, supervision is restarted and initialization is effected (see block 96) and the cell becomes busy again (see block 98). If the alarm flag is not set, the alarm is raised (see block 100) and the flag is set (see block 102). At this point, automatic action (see block 104) may effect either restarting of supervision (see, again, blocks 96 and 98) or a locking procedure (see blocks 106 and 108 in FIG. 6).

Referring back again to FIG. 1, it will be recalled that once the designing task is completed, the third step, operating, is begun in practice of the process of the present invention.

OPERATION

Assuming, by way of example only, that the teachings of the present invention are to be applied in a telecommunications environment, operating is the task of the telecom operator, and can be broken down as follows:

Parameters

At this stage it may be assumed that the telecom operator has defined the disturbance process and knows whether is smooth or lumpy. If it is smooth one has a good estimate of matrix (1) set forth above, and if it is lumpy one has a good estimate of matrix (2) set forth above.

In either event the telecom operator knows what disturbance frequencies are normal and abnormal.

The goal at this point is to choose reliable parameters for the leaky bucket, that is:
disturbance step;
floor; and
ceiling.

One wants to choose these parameters in such a way that if the counter hits the ceiling, one can be sure that the disturbance frequency genuinely has increased above its normal level. Another way of saying this is that the probability of false alarm, or false positive is very low. In the literature this is called "probability of type 1 error".

Further, if an alarm has been raised, and if the counter subsequently hits the floor, one wants to be sure that the disturbance frequency genuinely has returned to its normal level. One can say that the probability of false negative, or "type 2 error" is low.

Particularly irritating for the technician is the situation of "oscillating alarms", that is, alarms that keep going on and off. The technician does not know what to believe, and may well choose to ignore the alarms.

Finally, it is worth mentioning at this point what is meant by low probability. In everyday life a chance of "one in a thousand" is considered very small, and "a chance in a million" is considered negligible. One must remember that in disturbance supervision one may have many leaky buckets, where each one is running continuously. This means that a "chance in a million" can occur more than once a day as one has so much supervision going on.

CONFIDENCE INTERVAL

At this point a confidence interval must be defined. A detailed discussion of this process is appropriate.

Initially, however, it is useful to heuristically describe the random walk process Y. As previously mentioned, in such a process if the disturbance step, d, and the probability of a disturbance, q, are large, then Y will probably hit the ceiling, C. And if they are small, then Y will probably hit the floor, F. More precisely, the expected value of Y after one step is $$EY(1) = qd - p,$$

and after n steps is $$EY(N) = n(qd - p).$$

Y is a binominal with a variance VY(1) equal to $pq(1+d)^2$. In general, $VY(n) = npq(1+d)^2$.

Considering now a confidence interval I(n) for Y(n) described by its mean plus s standard deviations, then I(N) is specified by $n(qd-p) \pm s(1+d)\sqrt{npq}$ I(n) is a "cloud of probability", if you will, that moves upwards (if qd>p) or downwards (if qd<p) linearly with n, or lies still (if qd=p), and spreads with the root of n.

So, for a genuine random walk Y(n) which is the sum of n random variables X(i), as in matrix (1), we can define a confidence interval:

$$I(n) = nb \pm s(1 + d)\sqrt{npq}$$

where:
b = bias = qd − p,
s = number of standard deviations, and
d = disturbance step.
This gives one a floor or ceiling at a distance of:

$$2s^2pq \frac{(1 + d)^2}{b}$$

from zero.

If instead, Y(n) is a semi-random walk as in matrix (2), the confidence interval I(n) is described by:

$$I(n) = nb \pm ms(1 + d)\sqrt{nxy}$$

where x and y are the steady state probabilities of matrix 2.

This gives a floor or ceiling at:

$$2(ms)^2xy \frac{(1 + d)^2}{b}$$

from zero.

One can see that s has been replaced by ms, p by x and q by y.

Observe that the genuine random walk, that is a smooth disturbance process is simply a special case of the above, as m=1, p=x and q=y.

Thus, the following confidence interval is defined:

$$I(n) = nb \pm ms(1 + d)\sqrt{nxy}$$

where:
n = number of events,
b = bias = yd − x
m = magnification of the standard deviation
d = disturbance step
y = 1 − x = disturbance frequency.
This formula gives a ceiling and floor at:

$$\pm 2(ms)^2xy \frac{(1 + d)^2}{b}$$

This can be used in practice by first simplifying and approximating as follows:

$m^2 = (1+P)/Q$, where P and Q are as in matrix (2);
$d \gg 1$, so we ignore 1 in $d+1$;
x is very close to 1;
$d = (1+b)/y$.
One obtains:

$$2s^2 \frac{(1+P)}{Q} \frac{(1+b)^2}{yb}$$

Further substituting with
disturbance length $l = 1/Q$;
$P = 1 - Q$.
One obtains:

$$2s^2 \frac{(2l-1)}{y} \frac{(1+b)^2}{b} = k \frac{(2l-1)}{y}$$

where $$k = 2s^2 \frac{(1+b)^2}{b}$$

It may be noted at this point that the reliability constant, k, is a way of relating the level of significance, expressed by s, and the bias, expressed by b.

If one chooses k in some intelligent way one can know how to set the floor and the ceiling, given information about the process one is supervising.

It is worth noting that the mere fact that b is in the denominator in the formula for the confidence interval indicates that the confidence interval is infinite for an unbiased process.

At this point, the formula $$s = \frac{1}{1+b} k \sqrt{\frac{b}{2}}$$

may be evaluated for some values of k and b. First, however, it may be noted that C is positive and is of interest when one has a negative bias, and F is negative and is of interest when one has a positive bias. Therefore, the substitution above is incorrect and needs a minus sign. The correct definition of k is:

$$k = -2s^2 \frac{(1+b)^2}{b}$$

and is used in the table of values of s below.

| bias b | abs (k) = 20 | 80 | 180 | 320 | 500 |
|---|---|---|---|---|---|
| −50% | 4.5 | 9.0 | | | |
| −40% | 3.3 | 6.7 | | | |
| −30% | 2.5 | 5.0 | 7.4 | | |
| −20% | 1.8 | 3.6 | 5.3 | 7.2 | 8.9 |
| −10% | 1.1 | 2.2 | 3.3 | 4.4 | 5.6 |
| 0% | 0.0 | 0.0 | 0.0 | 0.0 | 0.0 |
| 10% | 0.9 | 1.8 | 2.7 | 3.6 | 4.5 |
| 20% | 1.2 | 2.4 | 3.6 | 4.7 | 5.9 |
| 30% | 1.3 | 2.7 | 4.0 | 5.3 | 6.7 |
| 40% | 1.4 | 2.8 | 4.2 | 5.7 | 7.1 |
| 50% | 1.5 | 3.0 | 4.5 | 6.0 | 7.5 |

The conclusions that can be drawn from this table are:
1. It is asymmetric in b;
2. A value of k as low as 20 is over-sensitive. The probability of false result is too high;
3. A value of k as high as 500 gives very significant results. But it can mean that one may have to wait unnecessarily long to get them;
4. Values of k between about 100 and 300 are satisfactory for most purposes. The exact value of k one chooses will of course depend on the application;
5. If one uses the same value of k when choosing both floor F and ceiling C, the probability of false positive is much less than the probability of false negative.

EXAMPLES

Now, for the reader's convenience in understanding and practicing the present invention, set forth immediately below is an example for a smooth process and an example for a lumpy process, as both of those processes have been defined hereinabove.

EXAMPLE FOR SMOOTH PROCESS

Suppose that one has studied a smooth process in the field, and that one can define the following four disturbance frequencies for that process:
fN = frequency in normal operation (e.g., 0.5%);
fH = high frequency in normal operation, but one which one can accept (e.g., 0.8%);
fC = critical frequency, at which one wants to raise an alarm (e.g., 1.0%); and
fU = unacceptable frequency (e.g., 1.5%).

The choice of disturbance step is based on the value of fC alone.

Disturbance step $d = 1/fC = 100$.

(If one is very strict, one should say that d = 99. But one of the consequences of the convention that disturbance frequencies are small is that one does not need to worry about the difference between 99, 100 or even 101 in this context.)

The choice of a reliability constant is somewhat arbitrary and may need some experimentation. One may choose, for example, k = 80. (If one gets too many false results, one must raise k. On the other hand, if one wants faster results, and can tolerate a few false results, one can reduce k. It is also possible to choose different values of k for F and C if one wishes.)

Now to choose a ceiling and a floor, for a smooth process one can simplify the formula for confidence interval to k/y. The reason for this is because the mean disturbance length l = 1.

y is the disturbance frequency = fC.

Therefore C = 80/1.0% = 8000, and F = −8000.

With respect to probabilities of a false result, one may observe that fN = 0.5% means a bias of −50%.

The table above shows that a false positive is improbable to a level determined by 9.0 standard deviations.

| | | |
|---|---|---|
| fH = 0.8%. | Bias b = −20% | Significance = 3.6 sd. |
| fC = 1.0%. | Bias b = 0. | Significance = 0. |
| fU = 1.5%. | Bias b = +50% | Probability of false negative is at 3.0 sd. |

If the disturbance frequency remains at fC for a long time, one will get "oscillating alarms", as the results obtained have no significance. This should be prevented.

EXAMPLE FOR LUMPY PROCESS

The reasoning here is essentially the same as for the smooth process. The only difference is that one must also consider l, the mean disturbance length.

Suppose again that one has done field studies of the disturbance process. Only this time one has pairs of values f and l, suffixed by N, H, C and U respectively.

Both f and l can vary, either dependently or independently of each other. In particular, any increase in l will cause a corresponding increase in f.

With respect to choice of disturbance step, the reasoning is the same as before.

Disturbance step $d = 1/fC$.

With respect to choice of sensitivity constant, the reasoning is the same again. But suppose this time that one chooses k=180.

With respect to choice of ceiling and floor, this time C and F are determined by the confidence interval: $k(2l-1)/f$, which can be simplified to $2kl/f$ for large l.

For example, if fC=1.0% and l=10, one obtains: C=180*19/1.0%=342 000, which is a "very large number." Similarly, F=−342 000.

With respect to probabilities of a false result, the reasoning here is also very much the same as before.

ALTERNATIVE APPROXIMATION

To provide the reader with another approximation, the relationship between k, s and b can be simplified to give:

$k = 2s^2/b$.

The behavior of this formula is similar to that of the correct formula. The simplified formula is a good way for getting a feel for the relationship. But it is an oversimplification. In particular, it is symmetrical in b. It therefore has the following weaknesses:

It is pessimistic in its estimates of the risk of false positives, that is, it overestimates them;

It is optimistic in its estimates of the risk of false negatives, that is, it underestimates them.

GUIDELINES

At this point, it is useful to present some guidelines for regular disturbance processes. Recall that regular and irregular have nothing to do with smooth and lumpy. A better word for regular is perhaps "metronomic."

In most practical applications of regular disturbances one needs to distinguish between micro-time and macro-time. Define K=number of micro-time intervals in one macro-time interval. Typically K is between 1 000 and one million.

Let f=disturbance frequency in micro-time. Typically $f \approx 10^{-6}$. But it is quite satisfactory as long as f<0.01, so that the risk of two disturbances in one micro-time interval can be ignored.

Let g=disturbance frequency in macro-time. Then g=Kf.

Typically g lies between about 0.01 and about 10. Clearly, the probability of more than one disturbance in a macro-time interval is significant, but that does not matter.

Let d=disturbance step.

In principle the counter is stepped down by 1/K for every normal event in micro-time, and stepped up for each disturbance by d.

This is equivalent to stepping down the counter by one for each macro-time interval, and stepping up the counter by d for every disturbance.

d=1/g, where g=critical frequency.

Note: By convention, the counter is an integer. But if d is less than say 10, it is impossible to choose an integer value of d in any meaningful way. One of the following solutions should be chosen:

1. the counter is made floating-point;
2. the macro-time interval is made shorter; or
3. the counter is scaled up.

The ceiling and floor are then chosen in exactly the same way as before, but using the macro-frequency g.

SUPERVISING AND ACTING

At this point, referring back to FIG. 1, choosing parameters (block 14 in FIG. 1) has been discussed in detail. The next two, and final two, steps in practice of the method of the present invention, are supervising and acting (see blocks 16 and 18, respectively, in FIG. 1).

Supervising is simply the task of physically setting the supervision parameters, as determined above, for the disturbance process to be supervised. These parameters may be set by some conventional form of command. Once started, supervision may also be stopped by some conventional form of command.

With respect to acting (that is, block 18 in FIG. 1), in operation of the present invention if the disturbance frequency should rise above the levels permitted by the supervision parameters an alarm is sent automatically to the technician. The technician should then both acknowledge the alarm and use some diagnostics to find out why the disturbance frequency is too high. Suitable diagnostics for this purpose are disturbance registration (which gives details about every single disturbance which is under surveillance) and disturbance statistics (which do some statistical analysis of the disturbances in order to find a pattern).

SUMMARY AND CONCLUSION

At this point, those skilled in the art should fully appreciate that the present invention provides a method for reacting to disturbances that occur in an industrial process, which method includes the steps of extracting information from the industrial process as to occurrence of normal events and occurrence of disturbances, transmitting the extracted information to a disturbance filter which includes a leaky bucket having a defined disturbance step and floor and ceiling height for the disturbances, and triggering an alarm when occurrence of disturbances in the industrial process falls without the defined disturbance step and floor and ceiling height. As mentioned above, the present invention also provides a rigorous method of setting parameters within certain supervisory algorithms.

Obviously, numerous modifications and variations of the present invention are possible in view of the teachings herein. Accordingly, within the scope of the appended claims, the present invention may be practiced otherwise than as specifically described hereinabove.

What is claimed is:

1. A method for reacting to disturbances that occur in an industrial process, each of said disturbances being of a type, said disturbances having a frequency of occurrence in said industrial process, said method comprising the steps of:

extracting information from said industrial process as to occurrence of normal events and occurrence of disturbances, disturbances of the same type defining a disturbance case;

transmitting said extracted information to a disturbance filter, said disturbance filter comprising at least one leaky bucket, said at least one leaky bucket having a disturbance case associated therewith, said at least one leaky bucket further having a defined disturbance step and floor and ceiling height for said disturbance case associated therewith, said defined disturbance step and floor and ceiling height comprising parameters for acceptable disturbance frequency, and triggering an alarm when the frequency of disturbances in said industrial process occurs without the parameters for acceptable disturbance frequency.

2. A method as recited in claim 1 wherein said disturbance filter comprises a plurality of leaky buckets, said plurality of leaky buckets arranged in rows with a distinct disturbance case assigned to each row.

3. A method as recited in claim 2, wherein each normal event and each disturbance has a probability associated therewith, wherein p is the probability of a normal event and q is the probability of a disturbance, and wherein said parameters for said plurality of leaky buckets are derived from a stochastic matrix as follows:

$$X(n+1) = \begin{matrix} 0 & 1 \\ \end{matrix}$$
$$X(n) = \begin{matrix} 0 \\ 1 \end{matrix} \begin{bmatrix} p & q \\ p & q \end{bmatrix}$$

for smooth processes.

4. A method as recited in claim 3, wherein P and Q are parameters such that $Q<p$ and $P>q$, and wherein said parameters for said plurality of leaky buckets are derived from a stochastic matrix as follows:

$$X(n+1) = \begin{matrix} 0 & 1 \\ \end{matrix}$$
$$X(n) = \begin{matrix} 0 \\ 1 \end{matrix} \begin{bmatrix} p & q \\ Q & P \end{bmatrix}$$

for lumpy processes.

5. A method as recited in claim 4, wherein there are two limits set for a leaky bucket, and wherein those two limits are set at distances of $$\pm 2(ms)^2 xy \frac{(1+d)^2}{b}$$

from zero, where b=bias, s=number of standard deviations, d=disturbance step, m=magnification of the disturbance step, and y=1−x=disturbance frequency.

6. A method as recited in claim 1, wherein the occurrence of disturbances within said industrial process defines a disturbance process, wherein said method further comprises the step of classifying said disturbance process into a regular or an irregular category, and wherein said method further comprises the step of using the category into which said disturbance process is classified to define a normal event.

7. A method as recited in claim 1, wherein said industrial process has at least one significance level, and further comprising the steps of extracting information from said industrial process as to significance levels s and different levels of bias b, deriving at least one reliability constant k which relates the significance levels and different levels of bias using the following equation $$k = 2s^2 \frac{(1+b)^2}{b},$$

and using a chosen value of k to help set the floor and ceiling height for said at least one leaky bucket.

* * * * *